Jan. 8, 1952  KUAN-HAN SUN ET AL  2,582,081
NEUTRON-ABSORBING BORATE GLASS
Filed Aug. 11, 1950
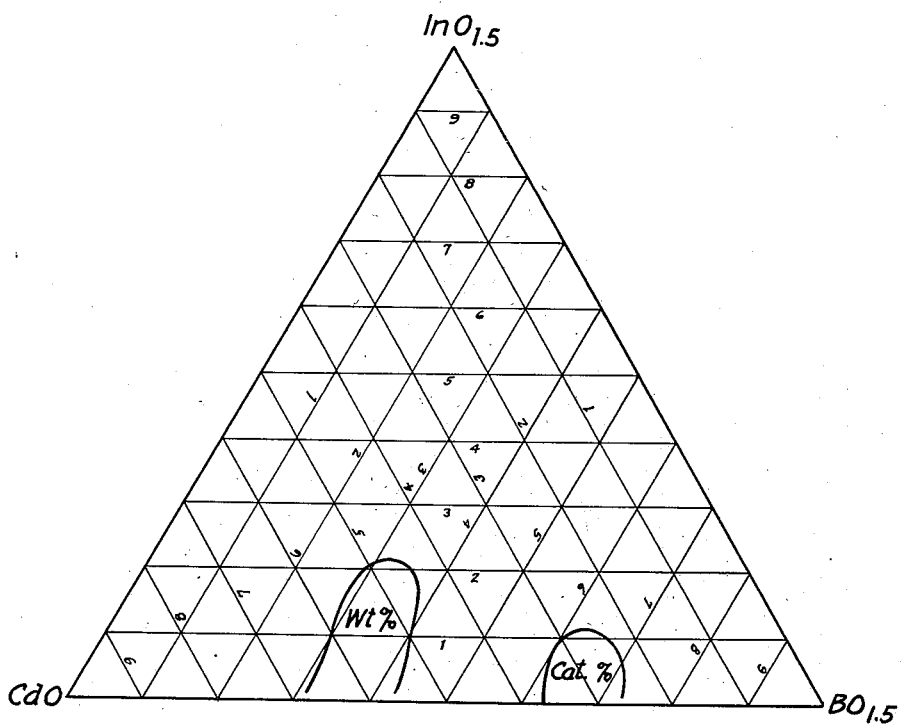
KUAN-HAN SUN
THOMAS E. CALLEAR
INVENTORS
BY Newton M. Perrins
Daniel F. Mayne
ATTORNEYS Patented Jan. 8, 1952

2,582,081

UNITED STATES PATENT OFFICE 2,582,081

NEUTRON-ABSORBING BORATE GLASS

Kuan-Han Sun, Pittsburgh, Pa., and Thomas E. Callear, Rochester, N. Y., assignors to Eastman Kodak Company, Rochester, N. Y., a corporation of New Jersey Application August 11, 1950, Serial No. 178,896

4 Claims. (Cl. 106—47)

This invention relates to a borate glass having high absorption of neutrons. We have found that among the best components that may be incorporated in synthesizing a glass opaque to slow neutrons are indium, cadmium and boron and that a borate glass containing mainly indium and cadmium is particularly useful and readily made. These elements have very high capture cross sections for neutrons.

The glass-forming ranges of the three oxides mentioned is shown diagrammatically in the accompanying chart in both weight and cationic percentages. It will be noted from the chart that the useful range of cadmium oxide is from 45 to 69 per cent by weight and 24 to 37 cationic per cent, of indium oxide from 2 to 21 per cent by weight and 1 to 11 cationic per cent, and of boron oxide from 28 to 42 per cent by weight and 60 to 73 cationic per cent. Since the designations $In_2O_3$ and $B_2O_3$ are empirical, we find it more expedient, particularly in computing cationic percentages, to use the forms $InO_{1.5}$ and $BO_{1.5}$. Table 1 gives the composition of a preferred example, the weight and cationic percentages being indicated, respectively, as W and C.

Table 1

|  | W | C |
|---|---|---|
| CdO | 55.0 | 29.3 |
| $InO_{1.5}$ | 12.0 | 5.9 |
| $BO_{1.5}$ | 33.0 | 64.8 |
| $n_D$ | 1.7321 |  |
| $v$ | 44.1 |  |
| P | 4.456 |  |

The index of refraction for the D-line, $n_D$, the Abbe value, $v$, and the density, P, are also given.

It is to be noted that in this glass relatively large amounts of indium oxide are introduced. Previous investigation has shown glasses containing a relatively small amount of indium to be colored yellow, but in those examples known to the present inventors sulphur was present, and it is believed that the yellow color may be ascribed to sulfide linkages. The glasses which we have obtained are colorless and are useful optically as well as being useful for shielding against neutrons.

It is a known fact that the capture cross section of the atoms, which is related to absorption probability, for the interception of high energy neutrons (say 1 m. e. v. or higher) of all materials are considerably smaller as compared to that for low energy or slow neutrons (a few e. v. or below). It has been a general practice in nuclear science and engineering that neutrons are slowed down by colliding with a moderator to thermal or near thermal energy before any absorption is effected. By this way, materials with high cross sections for slow or thermal neutrons can be used most efficiently. Absorbers, such as metallic cadmium, boron-steel, etc., are generally adopted for the controlling purpose in a neutron chain reactor because of their higher cross sections for slow neutrons and also because of their abundance and availability.

The absorption of a neutron beam through a material is found to follow the general exponential law, namely, $$(I/I_0) = e^{-\mu t}$$

where $I_0$ is the initial intensity of the neutron beam, $I$ is the intensity of the beam after passing through the material in consideration, $\mu$ is the absorption coefficient and $t$ is the thickness of the absorbing material. The absorption coefficient, $\mu$, may be obtained from the relationship:

$$\mu = n\sigma$$

where $n$ is the number of atoms or nuclei per unit volume, or per $cm.^3$, and $\sigma$ is the capture cross section per atom or nucleus in the unit of $cm.^3$ referred to in the previous section. For a glass which is composed of various kinds of atoms, the absorption coefficient is obtained through the summation of partial absorption coefficients contributed by the component atoms. It is obvious that the larger the absorption coefficient or cross sections, the higher the absorption or the better the absorber. The absorption coefficients of the glass of Table 1 for various neutron energies are given in Table 2:

Table 2

| Neutron Energy in e. v. | Absorption Coefficient in $cm.^{-1}$, $\mu$ | Cadmium Equivalent $\epsilon$ |
|---|---|---|
| 0.025 | 46 | 0.42 |
| 1.4 | 26 | 47 |
| 10 | 1.2 | 5.8 |

The role of metallic cadmium for the absorption of slow neutrons is similar to that of metallic lead for the absorption of X- and γ-rays. For that reason, the term cadmium equivalent, ε, similar to that of lead equivalent in the case of X- or γ-rays, is introduced. It is defined as the thickness of cadmium equal in neutron absorption to a unit thickness of the material in consideration. It is simply the ratio of absorption coefficient for the material in consideration to that of metallic cadmium. Thus, a cadmium equivalent of 0.5 for a glass means that a glass of 1 unit thickness is equivalent or equal in neutron absorption, for the neutron energy indicated, to cadmium of 0.5 unit thickness. It is apparent that the larger the cadmium equivalent of a glass, the better absorber it is. Table 2 also gives the cadmium equivalent of the glass of Table 1 for three neutron energies, namely, 0.025 e. v., 1.4 e. v. and 10 e. v. 0.025 e. v. is universally adopted as the thermal energy of neutron. 1.4 e. v. lies near the resonance peak of indium. Neutrons in this range are also common. 10 e. v. is chosen arbitrarily for the sake of comparison. The cadmium equivalent for the thermal neutron energy for an ordinary glass (window glass, plate glass, container glass, ordinary X-ray protection glass, etc.) is about 0.001 to 0.002. This indicates the unusually high neutron absorption property of the glasses in the present invention, as the corresponding cadmium equivalent for the glass of Table 1 is 0.42. The cadmium equivalent of this glass at 1.4 e. v. neutron energy reaches a tremendous value of 47. This is not due to the unusually high absorption coefficient at this energy relative to that at 0.025 e. v., but rather due to the decline of the absorption coefficient of cadmium at 1.4 e. v. and the corresponding rise in the absorption coefficient of indium. The introduction of indium into glass is therefore most valuable in that a relatively small amount of indium contributes very highly in absorption coefficient at a relatively higher neutron energy than the thermal energy. For the absorption of fast neutrons, this means that the fast neutrons are slowed down to 1.4 e. v. much faster or quicker than that to 0.025 e. v., and therefore, are absorbed more efficiently than a pure cadmium type of absorber.

Table 3 gives the composition of a second glass which illustrates the fact that other component or components commonly used on ordinary glass compositions such as BaO can be introduced into this $CdO$-$InO_{1.5}$—$BO_{1.5}$ type of glass to an amount as high as 11 cationic or 25 weight per cent:

Table 3

|  | W | C |
|---|---|---|
| CdO | 27.0 | 14.1 |
| $InO_{1.5}$ | 12.0 | 5.8 |
| $BO_{1.5}$ | 36.0 | 69.2 |
| BaO | 25.0 | 10.9 |
| $n_D$ | 1.6867 |  |
| ν | 50.0 |  |

The glass is made by usual processes, the ingredients being introduced in powder form and mixed uniformly. Although the composition is expressed in terms of oxides, it is understood that any other compound which on thermal decomposition yields the same desired composition can be used equally well. Thus, the cadmium and boron, for example, may be introduced in the form of cadmium carbonate and boric acid. The batch may be melted in a platinum crucible at about 1150 to 1400° C. at which temperature it is melted down to a fluid liquid. It is shaken or stirred above the devitrification temperature and then poured into a mold previously heated to about 450 to 650° C. After slow cooling a clear and colorless glass is obtained.

We claim:
1. A neutron-absorbing, optical, borate glass of the system $CdO$—$InO_{1.5}$—$BO_{1.5}$ containing by weight as essential ingredients: cadmium oxide, 45 to 69 per cent; indium oxide, 2 to 21 per cent; boron oxide, 28 to 42 per cent the three said oxides totaling at least 75 per cent by weight.
2. A neutron-absorbing, optical glass consisting by weight of: cadmium oxide, 55 parts; indium oxide, 12 parts; and boron oxide, 33 parts.
3. A neutron-absorbing, optical glass consisting by weight of: cadmium oxide, 45 to 69 per cent; indium oxide, 2 to 21 per cent; and boron oxide, 28 to 42 per cent.
4. A neutron-absorbing optical borate glass of the system $CdO$—$InO_{1.5}$—$BO_{1.5}$, consisting essentially of cadmium oxide, 45 to 69 per cent by weight; indium oxide, 2 to 21 per cent by weight; boron oxide, 28 to 42 per cent.

KUAN-HAN SUN.
THOMAS E. CALLEAR.

No references cited.